United States Patent
Miyama et al.

(10) Patent No.: US 10,748,349 B2
(45) Date of Patent: Aug. 18, 2020

(54) STORAGE MEDIUM, IMAGE-PROCESSING SYSTEM, IMAGE-PROCESSING DEVICE, AND IMAGE-PROCESSING METHOD

(71) Applicant: NINTENDO CO., LTD., Kyoto (JP)

(72) Inventors: Satoshi Miyama, Kyoto (JP); Yosuke Mori, Kyoto (JP); Norihiro Aoyagi, Kyoto (JP); Yuta Yamashita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 3 days.

(21) Appl. No.: 16/229,344

(22) Filed: Dec. 21, 2018

(65) Prior Publication Data

US 2019/0259217 A1  Aug. 22, 2019

(30) Foreign Application Priority Data

Feb. 19, 2018  (JP) .................................. 2018-27012

(51) Int. Cl.

| G06T 15/00 | (2011.01) |
|---|---|
| G06T 19/20 | (2011.01) |
| G06T 15/20 | (2011.01) |
| G06T 7/13 | (2017.01) |
| G06T 7/50 | (2017.01) |
| G06T 15/02 | (2011.01) |
| A63F 13/25 | (2014.01) |
| G06T 7/90 | (2017.01) |

(52) U.S. Cl.
CPC .............. *G06T 19/20* (2013.01); *A63F 13/25* (2014.09); *G06T 7/13* (2017.01); *G06T 7/50* (2017.01); *G06T 7/90* (2017.01); *G06T 15/02* (2013.01); *G06T 15/20* (2013.01); *G06T 2219/2012* (2013.01)

(58) Field of Classification Search
CPC . G06T 15/02; G06T 15/20; G06T 15/40–405; G06T 19/20
See application file for complete search history.

(56) References Cited

U.S. PATENT DOCUMENTS

| 6,747,642 B1* | 6/2004 | Yasumoto | ............... G06T 15/02 |
|---|---|---|---|
| | | | 345/419 |
| 2017/0263046 A1* | 9/2017 | Patney | .................... G06T 15/20 |

OTHER PUBLICATIONS

[Online], "Nintendo Switch", https://www.nintendo.co.jp/switch/aaaca/photocontest/index.html, Feb. 5, 2018, 4 pages.
[Online], https://www.nintendo.co.jp/switch/aaaca/guide/index.html, Feb. 5, 2018, 2 pages.

* cited by examiner

*Primary Examiner* — Charles Tseng
(74) *Attorney, Agent, or Firm* — Nixon & Vanderhye P.C.

(57) ABSTRACT

An image conversion unit according to an embodiment includes a gradation unit, a black line extraction unit, and a white line extraction unit. The gradation unit classifies a pixel of a pre-conversion image as one of four levels based on a brightness of the pixel, and expresses, in a color corresponding to the level as which the pixel has been classified, a corresponding pixel of a converted image. The black line extraction unit extracts pixels of an outline of an object in the pre-conversion image, and expresses corresponding pixels of the converted image in black. The white line extraction unit extracts pixels adjacent to an outline of an object in the pre-conversion image, and expresses corresponding pixels of the converted image in white.

19 Claims, 10 Drawing Sheets

US 10,748,349 B2

STORAGE MEDIUM, IMAGE-PROCESSING SYSTEM, IMAGE-PROCESSING DEVICE, AND IMAGE-PROCESSING METHOD

CROSS REFERENCE TO RELATED APPLICATIONS

The disclosure of Japanese Patent Application No. 2018-27012, filed on Feb. 19, 2018, is incorporated herein by reference.

FIELD

An exemplary embodiment relates to an image-processing technique.

BACKGROUND AND SUMMARY

There is known in the art a technique for capturing a game play image.

An image-processing program according to an embodiment of the present invention comprises a non-transitory storage medium storing an image-processing program causing a computer to: render an image of a 3D virtual space by use of a depth buffer to generate a pre-conversion image; and perform an image conversion processing on the pre-conversion image to generate a converted image, wherein in the image conversion processing, the image-processing program causes the computer to: perform a first rendering of identifying a pixel of the pre-conversion image that is smaller in depth than another pixel positioned in a first area around the pixel, and differs in depth from the other pixel by more than a first reference value, and of expressing a pixel of the converted image corresponding to the identified pixel in a first color; and perform a second rendering of identifying a pixel of the pre-conversion image that is larger in depth than another pixel positioned in a second area around the pixel, and differs in depth from the other pixel by more than a second reference value, and of expressing a pixel of the converted image corresponding to the identified pixel in a second color.

DETAILED DESCRIPTION OF NON-LIMITING EXAMPLE EMBODIMENTS

1. Embodiment

Figure 1:
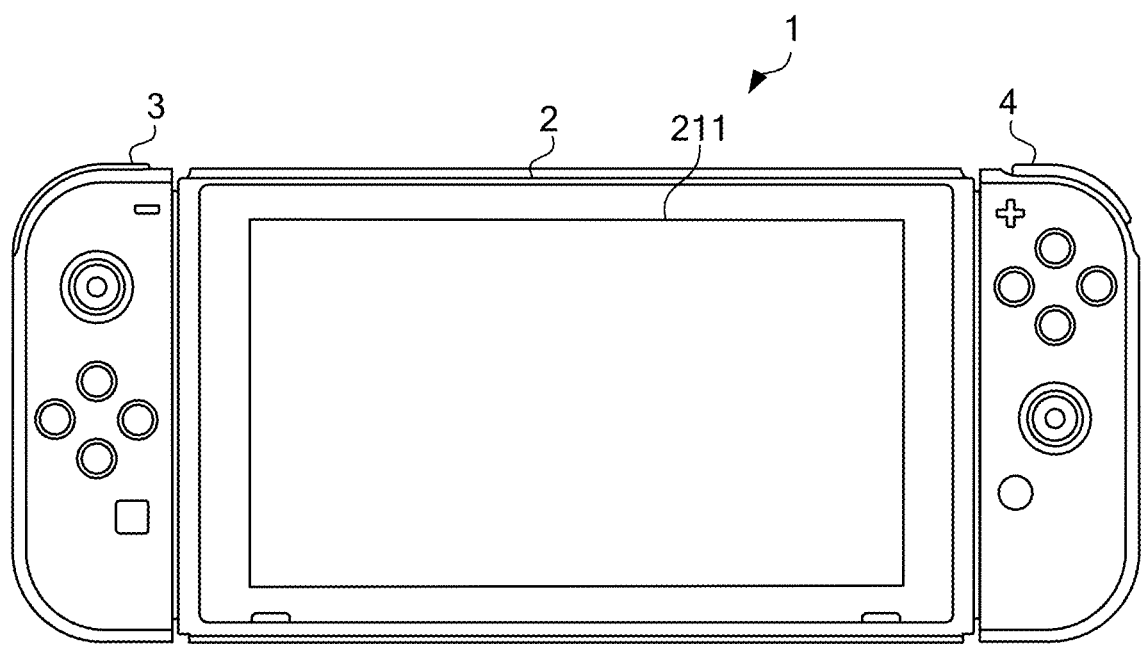
FIG. 1 is a diagram showing an example of an appearance of game system 1.

Game system 1 according to an embodiment of the present invention will now be described. FIG. 1 is a diagram showing an example of an appearance of game system 1. As shown in the drawing, game system 1 includes main device 2, left controller 3, and right controller 4. Left controller 3 and right controller 4, which, hereafter, may be collectively referred to as "controller," can be attached to and detached from main device 2. Game system 1 can be used either in a state in which left controller 3 and right controller 4 are attached to main device 2 or in a state in which left controller 3 and right controller 4 are detached from main device 2.

1-1. Configuration of Main Device 2

Figure 2:
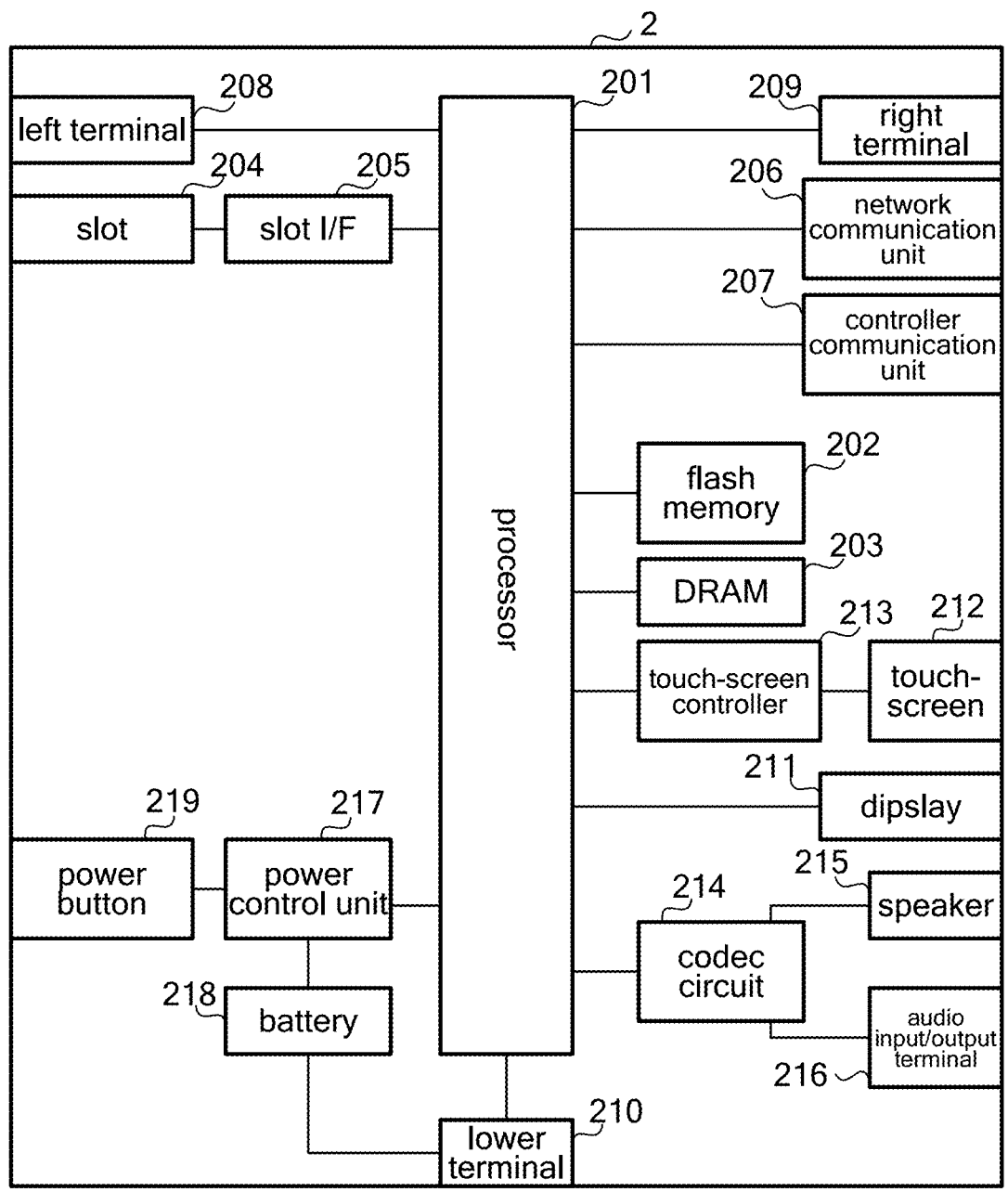
FIG. 2 is a block diagram showing an example of an internal configuration of main device 2.

FIG. 2 is a block diagram showing an example of an internal configuration of main device 2. As shown in the drawing, main device 2 includes processor 201, which is an information-processing unit for carrying out various types of information processing. Processor 201 may include only a central processing unit (CPU), or it may include a System-on-a-chip (SoC) having plural functions such as a central processing unit (CPU) function or a graphics processing unit (GPU) function. Processor 201 may execute a program stored in an internal storage medium or an external storage medium for insertion into slot 204, to thereby carry out various types of information processing.

As examples of an internal storage medium, main device 2 includes flash memory 202 and dynamic random access memory (DRAM) 203. Flash memory 202 is a non-volatile memory for storing various types of data, and DRAM 203 is a volatile memory for temporarily storing various types of data.

Main device 2 also includes slot 204 and a slot interface (hereafter, abbreviated as "I/F") 205. Slot 204 is provided on an upper side of the housing of main device 2 and is shaped to allow insertion of an external storage medium such as a memory card. Slot I/F 205 may read and write data to an external storage medium inserted into slot 204 in accordance with instructions from processor 201.

Main device 2 also includes network communication unit 206, which is capable of wireless communication with an external device by using a wireless LAN or by using infrared.

Main device 2 also includes controller communication unit 207, which is capable of wireless communication with left controller 3 and right controller 4 by use of near-field communication technology such as Bluetooth (registered trademark).

Main device 2 also includes left side terminal 208, right side terminal 209, and lower side terminal 210. Left side terminal 208 is a terminal that enables main device 2 to carry out wired communication with left controller 3. Right terminal 209 is a terminal that enables main device 2 to carry out wired communication with right controller 4. Lower terminal 210 is a terminal that enables enabling main device 2 to communicate with a cradle. When connected to the cradle, main device 2 is able to output images and sounds to an external stationary monitor via the cradle.

Main device 2 also includes display 211, which is a display device such as a liquid crystal display or an organic EL display.

Main device 2 also includes touch-screen 212 and touch-screen controller 213. Touch-screen 212 is, for example, a capacitive touch screen, which is layered on top of display 211; and touch-screen controller 213 is a circuit for controlling touch-screen 212. Based on a signal output from touch-screen 212, touch-screen controller 213 generates data indicative of a position touched on touch screen 212, and outputs the generated data to processor 201.

Main device 2 also includes codec circuit 214, speaker 215, and audio input/output terminal 216. Codec circuit 214 is a circuit for controlling input and output of audio data to speaker 215 and audio input/output terminal 216.

Main device 2 also includes power control unit 217, battery 218, and power button 219. Power control unit 217 controls supply of power from battery 218 to components of main device 2 under control of processor 201.

1-2. Configurations of Controllers

Figure 3:
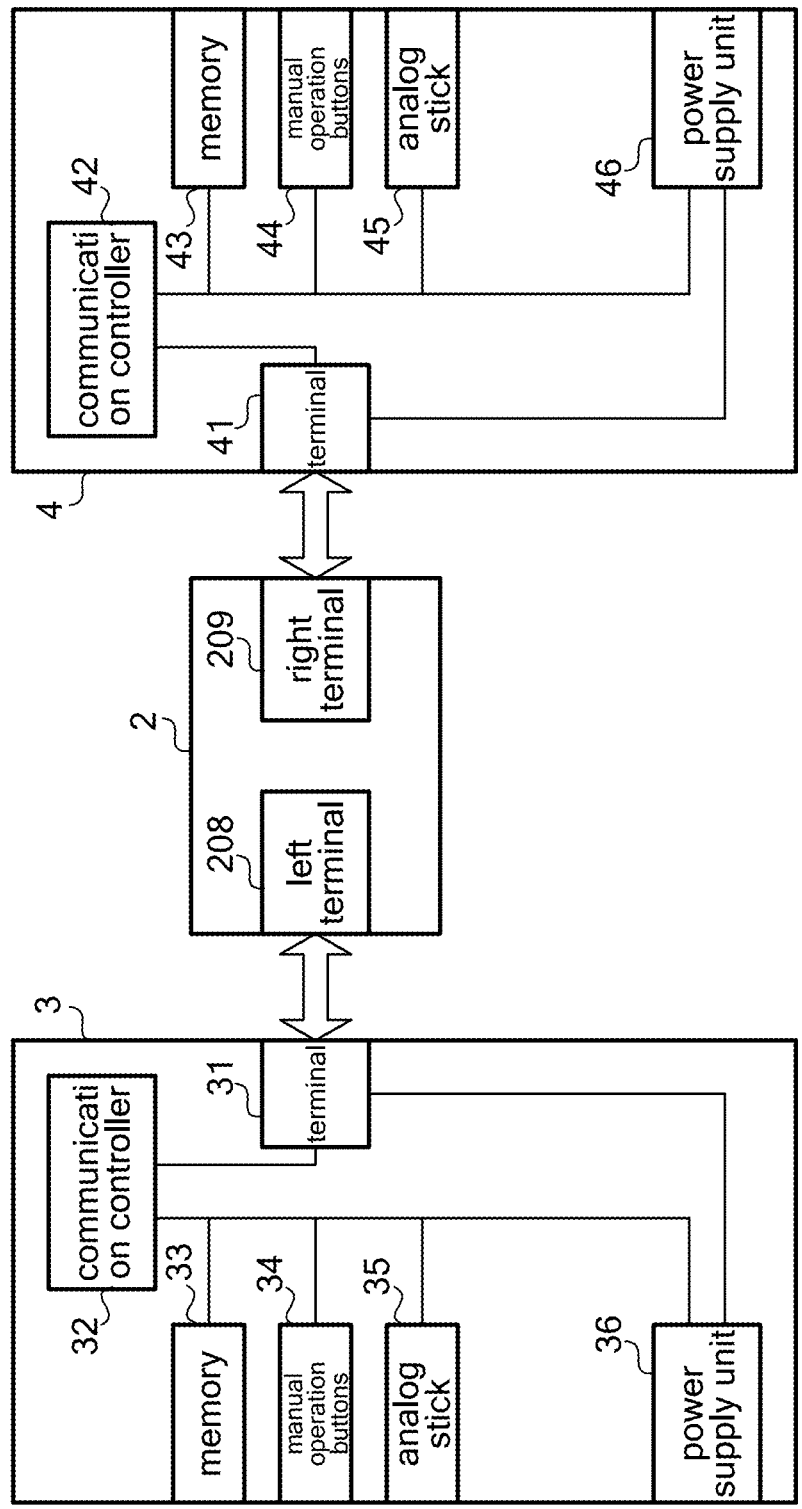
FIG. 3 is a block diagram showing an example of an internal configuration of left controller 3 and right controller 4.

FIG. 3 is a block diagram showing an example of an internal configuration of left controller 3 and right controller 4. As shown in the drawing, left controller 3 includes terminal 31 for enabling left controller 3 to perform wired communication with main device 2.

Left controller 3 includes communication controller 32, which includes a microprocessor for control of communication with main device 2. Communication controller 32 is capable of both wired communication via terminal 31 and wireless communication not via terminal 31 with main device 2. When left controller 3 is attached to main device 2, communication controller 32 performs wired communication with main device 2 via terminal 31; whereas when left controller 3 is not attached to main device 2, communication controller 32 performs wireless communication with main device 2.

Left controller 3 also includes memory 33 such as a flash memory. Communication controller 32 executes firmware stored in memory 33 to carry out various types of processing.

Left controller 3 also includes various manual operation buttons 34 and analog stick 35, each of which may be used to output manual operation data to communication controller 32. Communication controller 32 sends obtained manual operation data to main device 2.

Left Controller 3 also includes power supply unit 36, which includes a battery and a power control circuit.

Right controller 4 includes terminal 41 for enabling right controller 4 to perform wired communication with main device 2.

Right controller 4 includes communication controller 42, which includes a microprocessor for control of communication with main device 2. Communication controller 42 is capable of both wired communication via terminal 41 and wireless communication not via terminal 41 with main device 2. When right controller 4 is attached to main device 2, communication controller 42 performs wired communication with main device 2 via terminal 41; whereas when right controller 4 is not attached to main device 2, communication controller 42 performs wireless communication with main device 2.

Right controller 4 also includes memory 43 such as a flash memory. Communication controller 42 executes firmware stored in memory 43 to carry out various types of processing.

Right controller 4 also includes various manual operation buttons 44 and analog stick 45, each of which may be used to output manual operation data to communication controller 42. Communication controller 42 may send obtained manual operation data to main device 2.

Right controller 4 also includes power supply unit 46, which includes a battery and a power control circuit.

1-3. Outline of Operation of Game System 1

Operation of game system 1 will now be described.

When an external storage medium storing a game program is inserted into slot 204, and an instruction to start a game is received by a user, game system 1 executes the game program. In the following description, it is assumed that an action game is played by a player, in which the player operates a character within a 3D virtual space. It is of note that the action game is merely one example of a game; and another type of game may be played.

Figure 4:
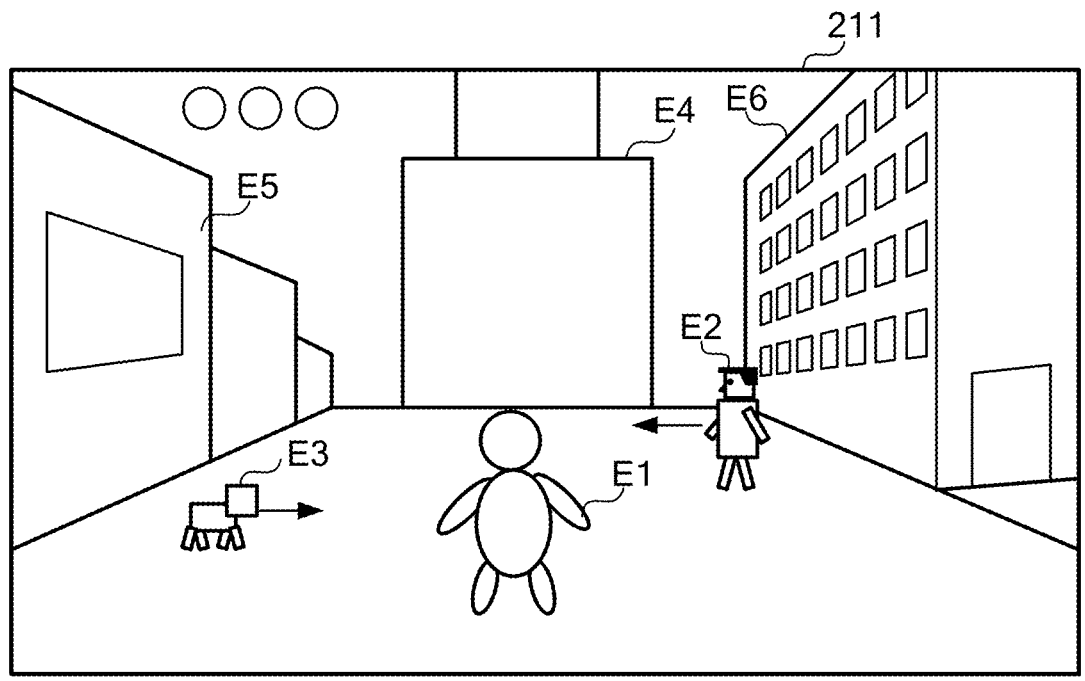
FIG. 4 is a diagram showing an example of an image that may be shown on display 211 during game play.

FIG. 4 is a diagram showing an example of an image that can be shown on display 211 during playing of a game. As shown in the drawing, after start of the game a 3D virtual space is defined within which a virtual camera is disposed, and images generated using the virtual camera are shown on display 211. Within the 3D virtual space, display objects are arranged such as player character E1 operated by a player, non-player characters E2 and E3 controlled by processor 201, tower object E4, and building objects E5 and E6.

The game has two modes: a game-playing mode and an image capture mode. The game-playing mode is a mode that enables a player to operate player character E1 to complete missions. In the game-playing mode, player character E1 moves in accordance with an operation carried out by a player, while non-player characters E2 and D3 move under control of processor 201. In the game-playing mode, time advances. On the other hand, in the image capture mode a player is able to operate the controller and save an image displayed on display 211 as a still image. In the image capture mode, player character E1 and non-player characters E2 and E3 do not move, and time also stops. By operating the controller, a player can switch between the game-playing mode and the image capture mode.

In the image capture mode, when a player provides an image capture instruction, data of an image displayed on display 211 is stored in flash memory 202 as a snapshot image.

Figure 5:
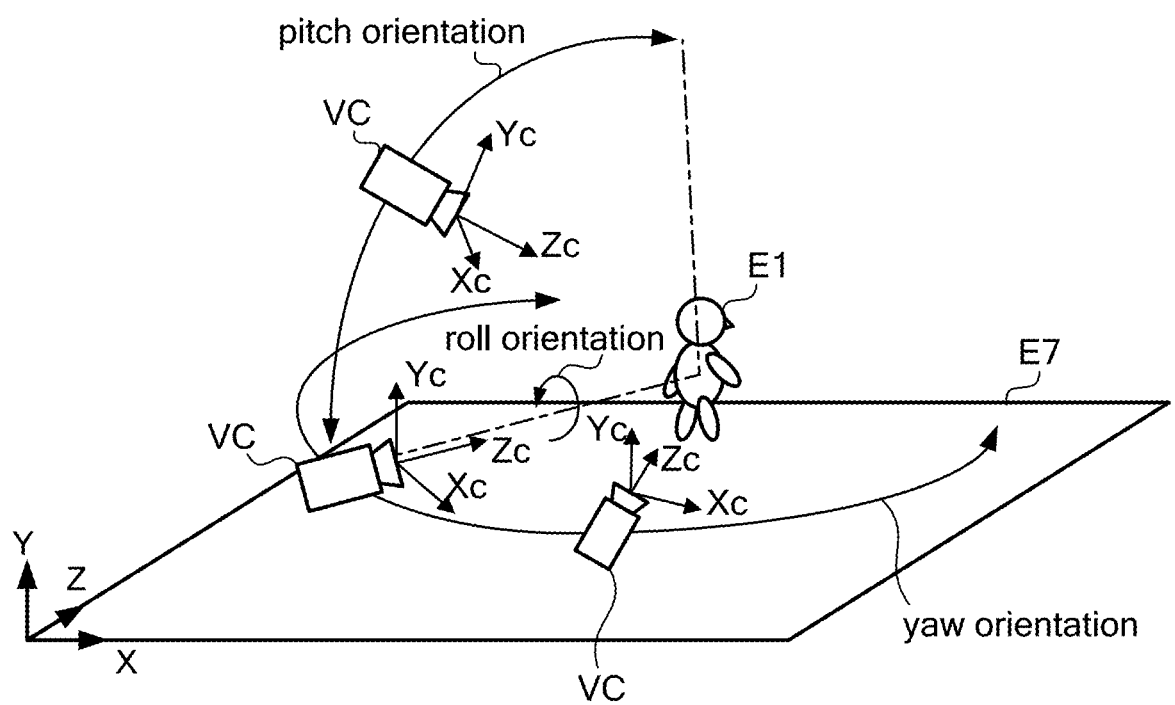
FIG. 5 is a diagram illustrating control of a position and an attitude of a virtual camera.

In the image capture mode, a player can control a position and an attitude of the virtual camera disposed within the virtual space. FIG. 5 is a diagram illustrating control of a position and an attitude of the virtual camera. As shown in the drawing, within the virtual space, a fixed xyz Cartesian coordinate system is defined. The y-axis is an axis extending in an upward direction within the virtual space, the x-axis is an axis perpendicular to the y-axis, and the z-axis is an axis perpendicular to the y-axis and the x-axis. On the x-z plane, ground surface object E7 is disposed, on which display objects such as player character E1 are disposed.

Within the virtual space, virtual camera VC is disposed. For virtual camera VC, a fixed XcYcZc Cartesian coordinate system is defined. The Xc-axis is an axis extending in a rightward direction of virtual camera VC, the Yc-axis is an axis extending in the upward direction of virtual camera VC, and the Zc-axis is an axis extending along the line of sight (or in the shooting direction) of virtual camera VC. Virtual camera VC may rotate around the Zc-axis (in a roll orientation) in accordance with a user's operation. Virtual camera VC may also rotate around the Yc-axis (in a pitch orientation), while virtual camera VC is aimed at player character E1, in accord with a user's operation. Virtual camera VC may also rotate around the Xc-axis (in a yaw orientation), while virtual camera VC is aimed at player character E1, in accord with a user's operation. Virtual camera VC may also change a zoom setting (or an angle of view) in accord with a user's operation. By performing such control on virtual camera VC, a player can capture an image of the virtual space from a desired position and angle.

In the image capture mode, a player can select a filter, which constitutes image processing by changing a display mode of an image displayed on display 211. When a player selects a filter, an image displayed on display 211 is converted into another image by image processing, and the converted image is displayed. Thereafter, when the player provides an image capture instruction, data of the converted image displayed on display 211 is stored in flash memory 202 as a snapshot image. Selectable types of filter may include "blur," "sepia," "black and white," and "cartoon."

The "blur" filter is a filter used to blur an image. The "sepia" filter is a filter used to convert an image into a sepia-tone image. The "black and white" filter is a filter used to convert an image into a black-and-white image. The "cartoon" filter is a filter used to convert an image into a cartoonish image. Below, a process of the "cartoon" filter will be described in detail.

1-4. Cartoon Filter Processing

Figure 6:
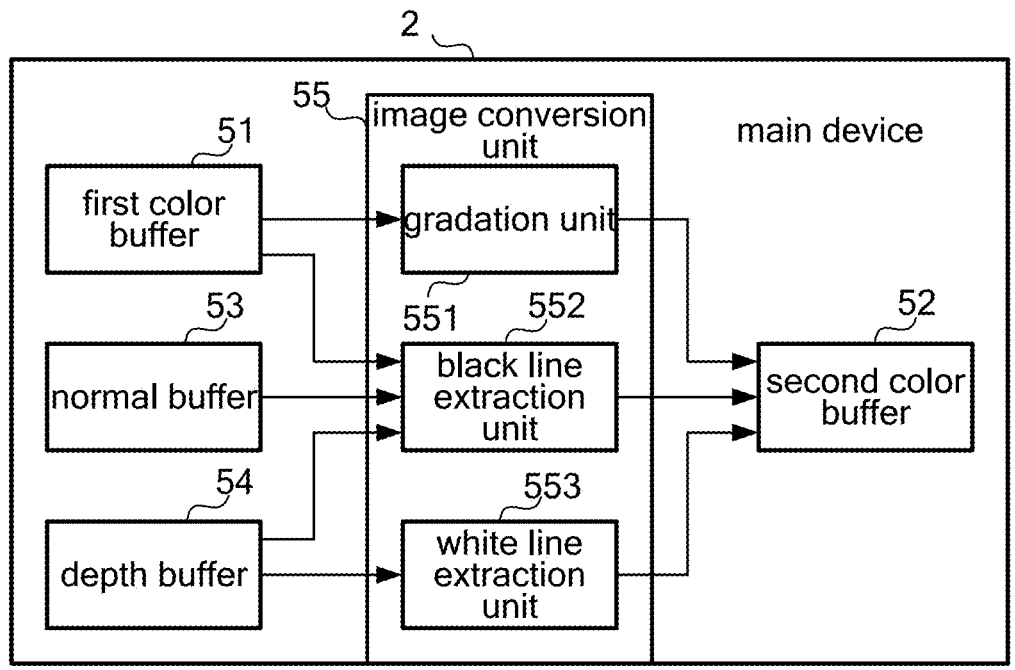
FIG. 6 is a block diagram showing an example of a functional configuration for carrying out cartoon filter processing.

FIG. 6 is a block diagram showing an example of a functional configuration for carrying out cartoon filter processing. Image conversion unit 55 as shown in the drawing is provided upon execution of a game program by processor 201. First color buffer 51, second color buffer 52, normal buffer 53, and depth buffer 54 are spaces that are secured on a memory such as DRAM 203 upon execution of the game program by processor 201. The game program is a program that may be distributed via a network such as the Internet or on a non-transitory storage medium.

First color buffer 51 is a buffer for storing color information of pixels of an image (hereinafter referred to as "pre-conversion image") that is yet to be subjected to a cartoon filter processing. The pre-conversion image refers to an image that is generated as a result of rendering an image of a 3D virtual space by use of depth buffer 54. The rendering is performed based on a position and an attitude of the virtual camera. The color information stored in first color buffer 51 refers to sets of RGB values. Each RGB value is expressed by, for example, a value from "0" to "1." RGB values (0, 0, 0) represent a black color, and RGB values (1, 1, 1) represent a white color.

Second color buffer 52 is a buffer for storing color information of pixels of an image (hereinafter referred to as "converted image") that has been subjected to a cartoon filter processing.

Normal buffer 53 is a buffer for storing data on normal directions of pixels of a pre-conversion image. Each of the normal directions is expressed by a normal vector to an object surface within the virtual space.

Depth buffer 54 is a buffer for storing data on depth values of pixels of a pre-conversion image. Each of the depth values is a value (or depth) representing a distance between the virtual camera and an object within the virtual space. A depth value increases in proportion to a distance between the virtual camera and an object. The starting point of a depth value may be either the virtual camera or an object.

Image conversion unit 55 performs a function of setting an image displayed on display 211 as a pre-conversion image, and of subjecting the pre-conversion image to an image conversion processing to generate a converted image. Specifically, image conversion unit 55 performs a cartoon filter processing as the image conversion processing. Image conversion unit 55 includes gradation unit 551, black line extraction unit 552, and white line extraction unit 553.

Gradation unit 551 performs a function of classifying each of pixels of a pre-conversion image as one of plural types based on a predetermined condition, and of expressing, in a color corresponding to the type that the pixel has been classified as, a corresponding pixel of a converted image. Specifically, gradation unit 551 classifies a pixel of a pre-conversion image as one of four levels based on a brightness of the pixel, and expresses, in a color corresponding to the level, to which the pixel has been classified, a corresponding pixel of a converted image. Brightness B of the pixel may be obtained by using the following equation, for example.

$$B=0.298912*\text{Red}+0.586611*\text{Green}+0.114478*\text{Blue}$$

Colors corresponding to the four levels are white, gray, screen tone (hereafter, "tone"), and black in descending order of a brightness. White herein is not limited to a color represented by RGB values (1, 1, 1), and may include an off-white color such as ivory. The gray is an achromatic color represented by RGB values that are equal to each other. The tone refers to, for example, shaded hatching, which is expressed by a texture pasted on a screen. The black herein is not limited to a color represented by RGB values (0, 0, 0), and may include a similar color such as iron black.

A pixel of a converted image corresponding to a pixel of a pre-conversion image refers to a pixel sharing a position relative to an entire image with the pixel of the pre-conversion image, such as a pixel sharing coordinates with the pixel of the pre-conversion image.

Black line extraction unit 552 performs a function of extracting pixels of an outline of an object in a pre-conversion image, and of expressing corresponding pixels of a converted image in black. This function makes outlines of objects clear. Specifically, black line extraction unit 552 identifies pixels of a pre-conversion image that satisfy at least one of the following three conditions, and expresses corresponding pixels of a converted image in black.

A. A pixel value is different from that of one of reference pixels positioned in a predetermined surrounding area, and the difference is larger than a predetermined reference value.

B. A normal direction is different from that of one of reference pixels positioned in a predetermined surrounding area, and the difference (or angular difference) is larger than a predetermined reference value.

C. A depth value is smaller than that of one of reference pixels positioned in a predetermined surrounding area, and the difference is larger than a predetermined reference value.

It is of note that a pixel of a converted image corresponding to a pixel of a pre-conversion image refers to a pixel sharing a position relative to an entire image with the pixel of the pre-conversion image, such as a pixel sharing coordinates with the pixel of the pre-conversion image. The black is not limited to a color represented by RGB values (0, 0, 0), and may include a similar color such as iron black.

Figure 7:
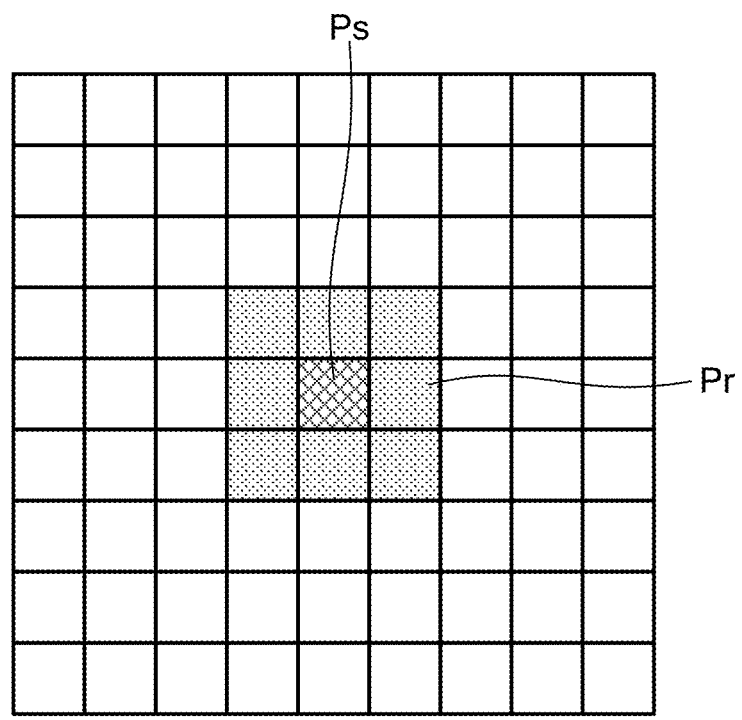
FIG. 7 is a diagram showing an example of a positional relationship between reference pixels and a target pixel.

FIG. 7 is a diagram showing an example of a positional relationship between reference pixels referred to in condition A and a pixel to be processed (hereinafter referred to as "target pixel"). In the example shown in the drawing, eight pixels Pr adjoining in the upward, downward, rightward, leftward, and four oblique directions of target pixel Ps are identified as reference pixels. The pixel value referred to in condition A refers to, specifically, an RGB value. The predetermined reference value referred to in condition A refers to, specifically, predetermined threshold value Cth, which is set such that a desired converted image is generated.

Figure 8:
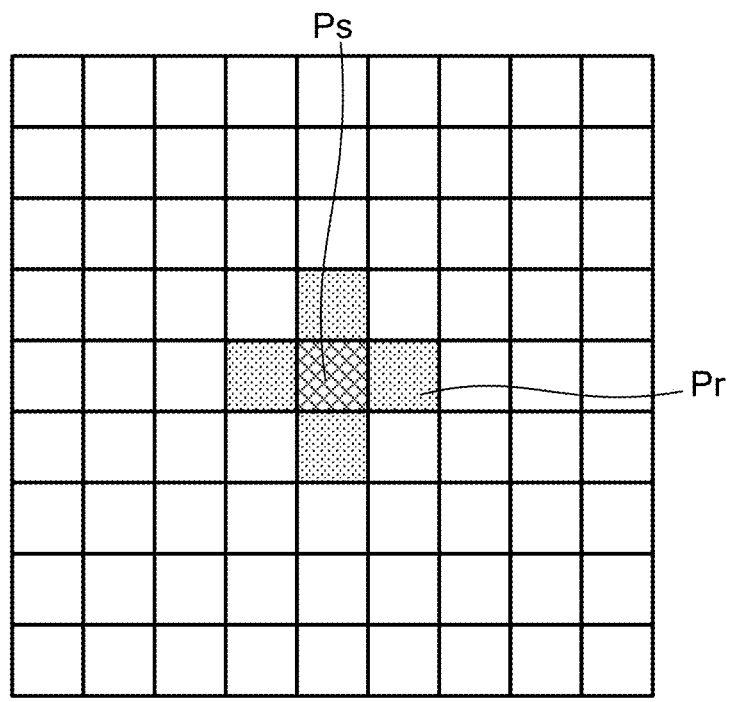
FIG. 8 is a diagram showing an example of a positional relationship between reference pixels and a target pixel.

FIG. 8 is a diagram showing an example of a positional relationship between reference pixels referred to in condition B and a target pixel. In the example shown in the drawing, four pixels Pr adjoining in the upward, downward, rightward, and leftward directions of target pixel Ps are identified as reference pixels. The positional relationship is replaced with another depending on an angle of view of the virtual camera. Specifically, in a case where an angle of view of the virtual camera is smaller than a threshold value, the positional relationship as shown in FIG. 7 is used, so that eight pixels Pr adjoining in the upward, downward, rightward, leftward, and four oblique directions of target pixel Ps are identified as reference pixels. The predetermined reference value referred to in condition B refers to, specifically, predetermined threshold value Nth, which is set such that a desired converted image is generated.

An example of a positional relationship between reference pixels referred to in condition C and a target pixel is shown in FIG. 7. The predetermined reference value referred to in condition C refers to, specifically, predetermined threshold value Dth1, which is set such that a desired converted image is generated.

White line extraction unit 553 performs a function of extracting pixels adjacent to an outline of an object in a pre-conversion image, and of expressing corresponding pixels of a converted image in white. This function enables outlines of objects to be edged with a white line, so that the outlines are made clearer. Specifically, white line extraction unit 553 identifies pixels of a pre-conversion image that satisfy both of the following two conditions, and expresses corresponding pixels of a converted image in white.

D. A depth value is larger than that of one of reference pixel sets positioned in a predetermined surrounding area, and a depth value of the one of reference pixel sets is smaller than a predetermined reference value.

E. The difference with the depth value of the one of reference pixel sets is larger than a predetermined reference value.

It is of note that a pixel of a converted image corresponding to a pixel of a pre-conversion image refers to a pixel sharing a position relative to an entire image with the pixel of the pre-conversion image, such as a pixel sharing coordinates with the pixel of the pre-conversion image. The white is not limited to a color represented by RGB values (1, 1, 1), and may include an off-white color such as ivory.

Figure 9:
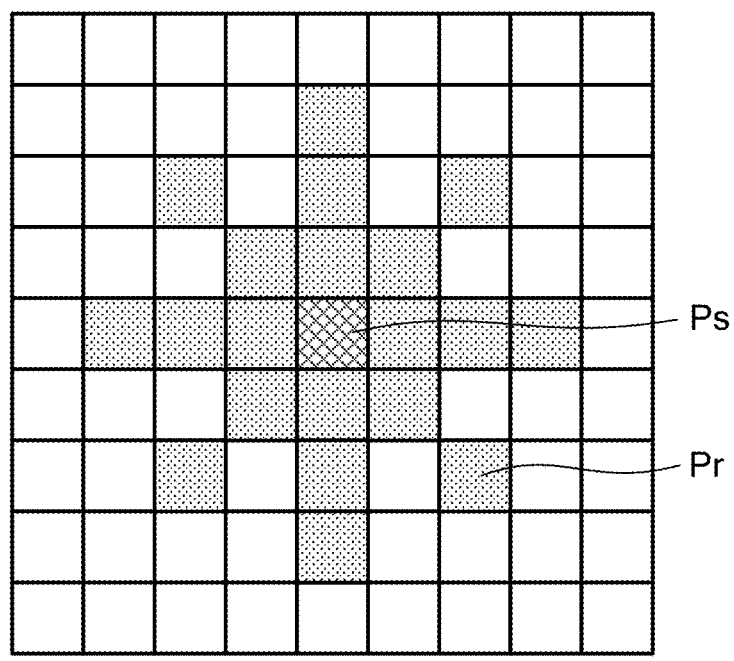
FIG. 9 is a diagram showing an example of a positional relationship between reference pixels and a target pixel.

FIG. 9 is a diagram showing an example of a positional relationship between reference pixels referred to in condition D and a target pixel. In the example shown in the drawing, 20 pixels Pr including consecutive three pixels Pr positioned along each of the upward, downward, rightward, and leftward directions of target pixel Ps, and consecutive two pixels Pr positioned along each of the four oblique directions of target pixel Ps are identified as reference pixels. The reference pixel sets referred to in condition D are groups of reference pixels, each of which has a predetermined positional relationship. A depth value of a target pixel is compared with an average of depth values of a group of reference pixels having a predetermined positional relationship. The predetermined reference value referred to in condition D refers to, specifically, variable threshold value Dth2, which is set such that threshold value Dth2 decreases with distance from a target pixel to a reference pixel set.

The predetermined reference value referred to in condition E refers to, specifically, predetermined threshold value Dth3, which is set such that a desired converted image is generated.

When a target pixel satisfies both of the above conditions D and E, white line extraction unit 553 changes a density of a white color for a pixel to be expressed, in accordance with a difference in depth value between the target pixel and a reference pixel set. Specifically, white line extraction unit 553 increases the density of a white color relative to an increase in the difference in depth value.

Figure 10:
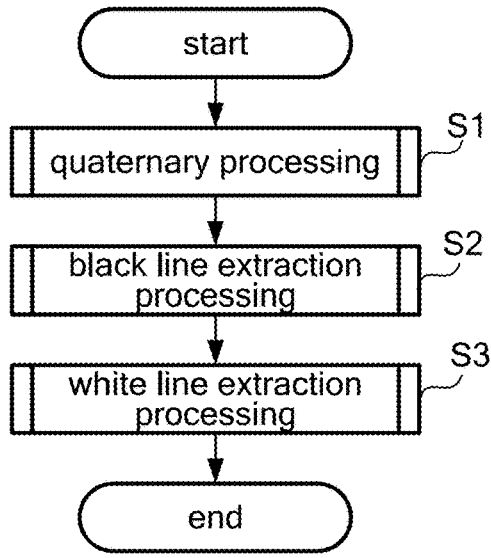
FIG. 10 is a flowchart showing an example of the cartoon filter processing.

FIG. 10 is a flowchart showing an example of a cartoon filter processing. When a player selects the cartoon filter in the image capture mode, image conversion unit 55 performs the processing shown in the drawing.

Figure 11:
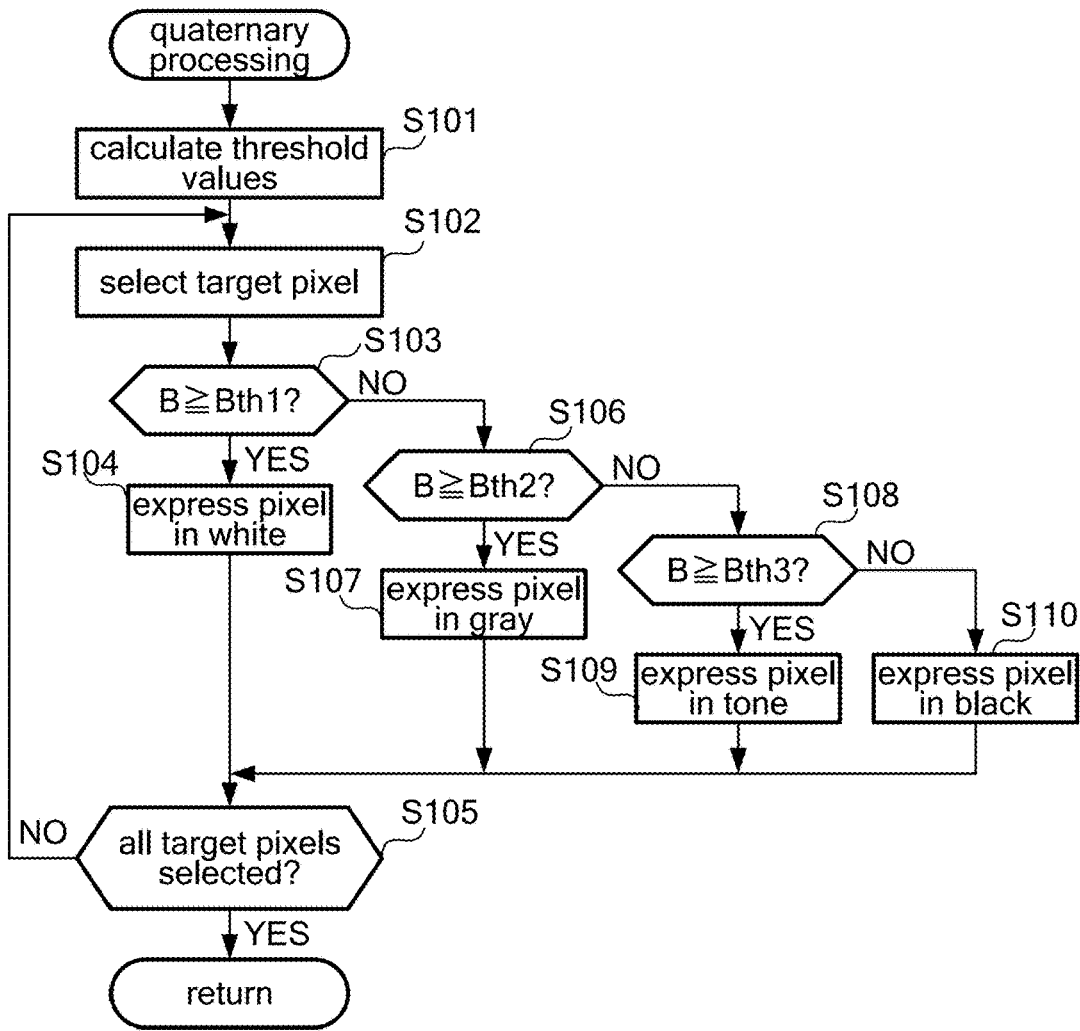
FIG. 11 is a flowchart showing an example of quaternary processing.

At step S1 shown in the drawing, gradation unit 551 performs a quaternary processing. FIG. 11 is a flowchart showing an example of the quaternary processing. At step S101 shown in the drawing, gradation unit 551 calculates threshold values for classifying pixels of a pre-conversion image into four levels. Specifically, gradation unit 551 calculates threshold value Bth1, threshold value Bth2, and threshold value Bth3 in descending order. These threshold values are calculated based on an average brightness, a maximum brightness, and a minimum brightness of the pre-conversion image. For example, threshold value Bth2 is obtained by calculating an average brightness of the pre-conversion image, threshold value Bth1 is obtained by multiplying a difference between a maximum brightness and a minimum brightness of the pre-conversion image by a predetermined value such as a value "0.8," and threshold value Bth3 is obtained by multiplying the difference by a predetermined value such as a value "0.2."

After calculating the threshold values, gradation unit 551 selects a target pixel of the pre-conversion image that has not yet been selected (step S102).

After selecting a target pixel, gradation unit 551 calculates brightness B of the selected target pixel to determine whether the calculated brightness B is equal to or greater than threshold value Bth1 (step S103). When brightness B is equal to or greater than threshold value Bth1 (YES at step S103), gradation unit 551 expresses a pixel of a converted image corresponding to the target pixel in white (step S104). Subsequently, gradation unit 551 determines whether all pixels of the pre-conversion image have been selected as target pixels (step S105). When all pixels have not been selected as target pixels (NO at step S105), gradation unit 551 returns to step S102. On the other hand, when all pixels have been selected as target pixels (YES at step S105), gradation unit 551 terminates the quaternary processing.

At step S103, when brightness B is smaller than threshold value Bth1 (NO at step S103), gradation unit 551 determines whether brightness B is equal to or greater than threshold value Bth2 (step S106). When brightness B is equal to or greater than threshold value Bth2 (YES at step S106), gradation unit 551 expresses a pixel of the converted image corresponding to the target pixel in gray (step S107). Subsequently, gradation unit 551 performs the above-mentioned step S105.

At step S106, when brightness B is smaller than threshold value Bth2 (NO at step S106), gradation unit 551 determines whether brightness B is equal to or greater than threshold value Bth3 (step S108). When brightness B is equal to or greater than threshold value Bth3 (YES at step S108), gradation unit 551 expresses a pixel of the converted image corresponding to the target pixel in a tone color (step S109). Subsequently, gradation unit 551 performs the above-mentioned step S105.

At step S108, when brightness B is smaller than threshold value Bth3 (NO at step S108), gradation unit 551 expresses a pixel of the converted image corresponding to the target pixel in black (step S110). Subsequently, gradation unit 551 performs the above-mentioned step S105.

The foregoing is a description of the quaternary processing.

Figure 12:
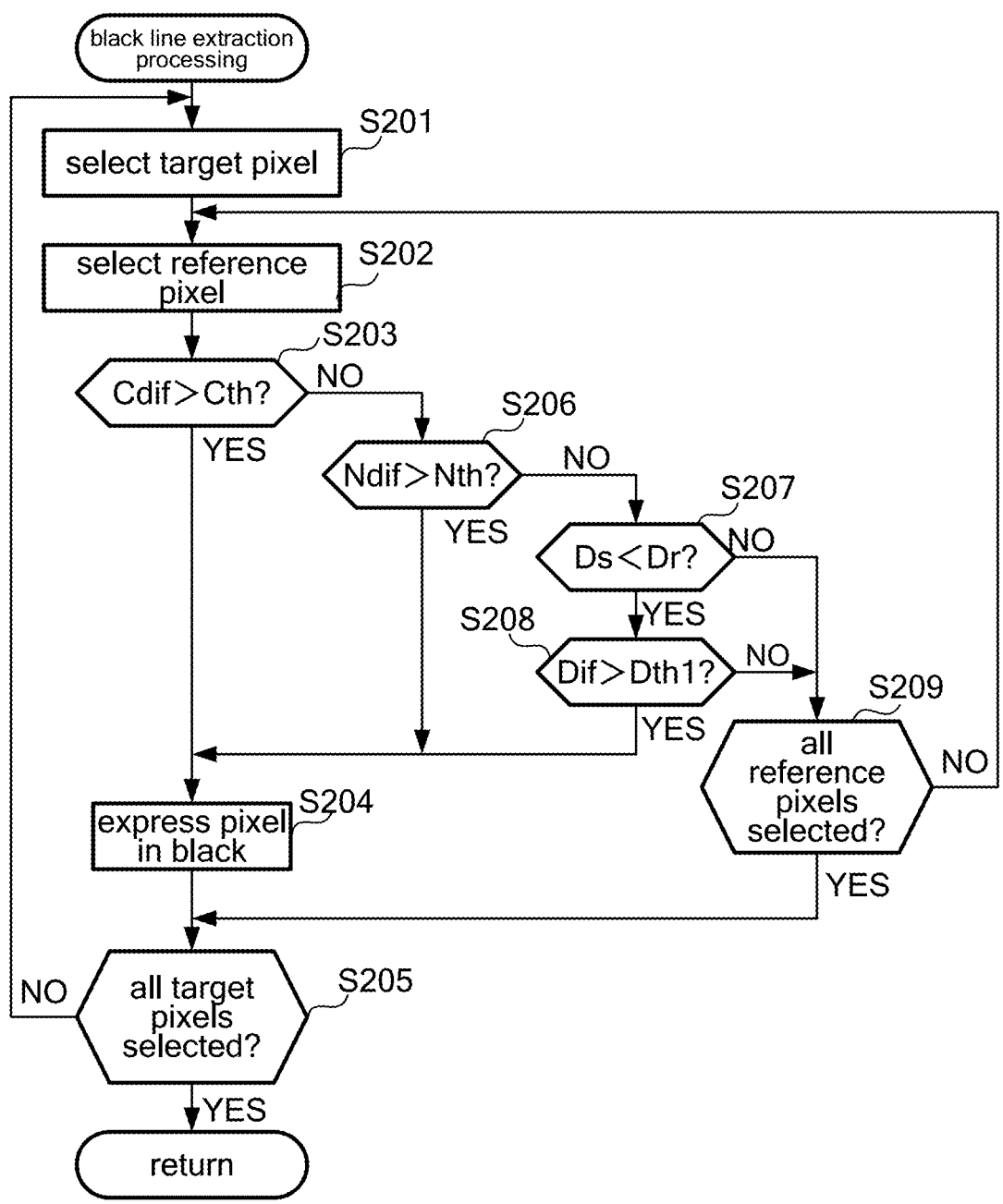
FIG. 12 is a flowchart showing an example of black line extraction processing.

After the quaternary processing is completed, black line extraction unit 552 performs a black line extraction processing (step S2 shown in FIG. 10). FIG. 12 is a flowchart showing an example of the black line extraction processing. At step S201 shown in the drawing, black line extraction unit 552 selects a target pixel of the pre-conversion image that has not yet been selected.

After selecting a target pixel, black line extraction unit 552 selects a reference pixel that has not been selected, from among pixels positioned in a predetermined area around the selected target pixel (step S202).

After selecting a reference pixel, black line extraction unit 552 determines whether difference Cdif in pixel value (one of RGB values) between the target pixel and the reference pixel is larger than threshold value Cth (step S203). When difference Cdif is larger than threshold value Cth (YES at step S203), black line extraction unit 552 expresses a pixel of the converted image corresponding to the target pixel in black (step S204). Subsequently, black line extraction unit 552 determines whether all pixels of the pre-conversion image have been selected as target pixels (step S205). When all pixels have not been selected as target pixels (NO at step S205), black line extraction unit 552 returns to step S201. On the other hand, when all pixels have been selected as target pixels (YES at step S205), black line extraction unit 552 terminates the black line extraction processing.

At step S203, when difference Cdif is smaller than or equal to threshold value Cth (NO at step S203), black line extraction unit 552 determines whether difference Ndif in normal direction between the target pixel and the reference pixel is larger than threshold value Nth (step S206). When difference Ndif is larger than threshold value Nth (YES at step S206), black line extraction unit 552 expresses a pixel of the converted image corresponding to the target pixel in black (step S204). Subsequently, black line extraction unit 552 performs the above-mentioned step S205.

At step S206, when difference Ndif is smaller than or equal to threshold value Nth (NO at step S206), black line extraction unit 552 determines whether depth value Ds of the target pixel is smaller than depth value Dr of the reference pixel (step S207). When depth value Ds is smaller than depth value Dr (YES at step S207), black line extraction unit 552 determines whether difference Ddif between depth value Ds and depth value Dr is larger than threshold value Dth1 (step S208). When difference Ddif is larger than threshold value Dth1 (YES at step S208), black line extraction unit 552 expresses a pixel of the converted image corresponding to the target pixel in black (step S204). Subsequently, black line extraction unit 552 performs the above-mentioned step S205.

At step S207, when depth value Ds is equal to or larger than depth value Dr (NO at step S207), or at step S208, when difference Ddif is smaller than or equal to threshold value Dth1 (NO at step S208), black line extraction unit 552 determines whether all pixels positioned within a predetermined area around the selected target pixel have been selected as reference pixels (step S209). When all pixels have not been selected as reference pixels (NO at step S209), black line extraction unit 552 returns to step S202. On the other hand, when all pixels have been selected as reference pixels (YES at step S209), black line extraction unit 552 performs the above-mentioned step S205.

The foregoing is a description of the black line extraction processing.

Figure 13:
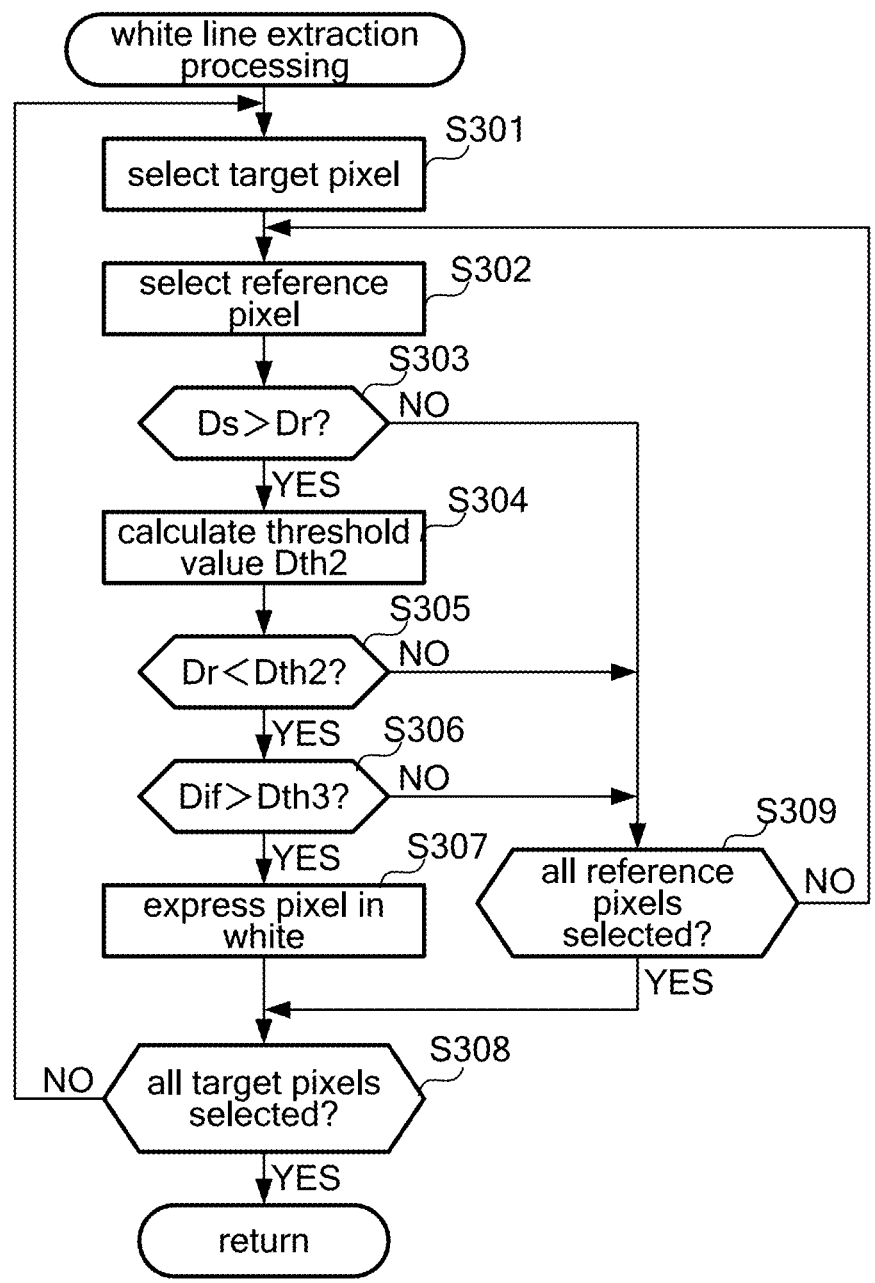
FIG. 13 is a flowchart showing an example of white line extraction processing.

After the black line extraction processing is completed, white line extraction unit 553 performs a white line extraction processing (step S3 shown in FIG. 10). FIG. 13 is a flowchart showing an example of the white line extraction processing. At step S301 shown in the drawing, white line extraction unit 553 selects a target pixel of the pre-conversion image that has not yet been selected.

After selecting a target pixel, white line extraction unit 553 selects a reference pixel that has not been selected, from among pixels positioned in a predetermined area around the selected target pixel (step S302).

After selecting a reference pixel, white line extraction unit 553 determines whether depth value Ds of the target pixel is larger than depth value Dr of the reference pixel (step S303). When depth value Ds is larger than depth value Dr (YES at step S303), white line extraction unit 553 calculates threshold value Dth2 based on a distance between the target pixel and the reference pixel (step S304). After calculating threshold value Dth2, white line extraction unit 553 determines whether depth value Dr is smaller than threshold value Dth2 (step S305). When depth value Dr is smaller than threshold value Dth2 (YES at step S305), white line extraction unit 553 determines whether difference Ddif between depth value Ds and depth value Dr is larger than threshold value Dth3 (step S306). When difference Ddif is larger than threshold value Dth3 (YES at step S306), white line extraction unit 553 expresses a pixel of the converted image corresponding to the target pixel in white (step S307). When doing so, white line extraction unit 553 increases the density of the white color relative to an increase in difference Ddif. Subsequently, white line extraction unit 553 determines whether all pixels of the pre-conversion image have been selected as target pixels (step S308). When all pixels have not been selected as target pixels (NO at step S308), white line extraction unit 553 returns to step S301. On the other hand, when all pixels have been selected as target pixels (YES at step S308), white line extraction unit 553 terminates the white line extraction processing.

At step S303, when depth value Ds is smaller than or equal to depth value Dr (NO at step S303), at step S305, when depth value Dr is equal to or larger than threshold value Dth2 (NO at step S305), or at step S306, when difference Ddif is smaller than or equal to threshold value Dth3 (NO at step S306), white line extraction unit 553 determines whether all pixels positioned within a predetermined area around the selected target pixel have been selected as reference pixels (step S309). When all pixels have not been selected as reference pixels (NO at step S309), white line extraction unit 553 returns to step S302. On the other hand, when all pixels have been selected as reference pixels (YES at step S309), white line extraction unit 553 performs the above-mentioned step S308.

The foregoing is a description of the white line extraction processing.

With completion of the white line extraction processing, the cartoon filter processing ends.

Figure 14:
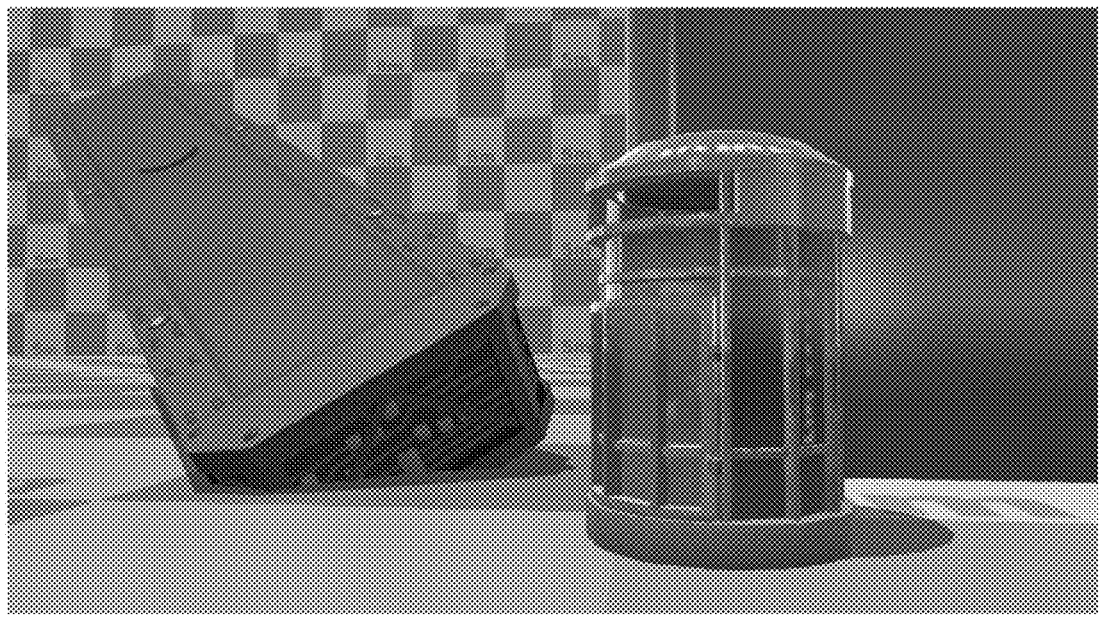
FIG. 14 is a diagram showing an example of a pre-conversion image.
Figure 15:
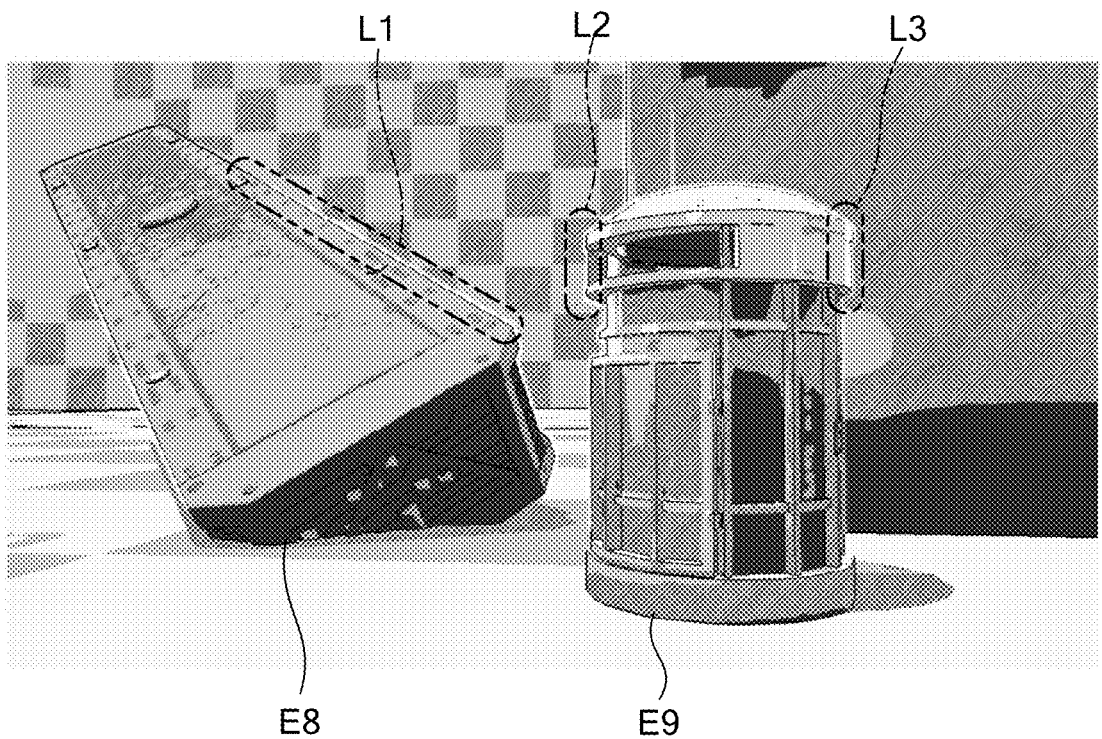
FIG. 15 is a diagram showing an example of a converted image.

FIG. 14 is a diagram showing an example of the pre-conversion image. FIG. 15 is a diagram showing an example of the converted image. The converted image shown in FIG. 15 appears less clear than the pre-conversion image shown in FIG. 14 as a result of the quaternary processing. Also, outlines of objects E8 and E9 are drawn with a black line as a result of the black line extraction processing, so that in the converted image, the boundaries between objects E8 and E9, and the background are clearer. Also, the outlines of objects E8 and E9 are edged with a white line as a result of the white line extraction processing, so that in the converted image, the boundaries between objects E8 and E9, and the background are clearer. According to the foregoing processing, the converted image appears more cartoon-like than the pre-conversion image.

It is of note that in the converted image, the white line edging the outline of object E8 gradually becomes thinner as distance from the virtual camera increases (see two-dot chain line L1). This is because threshold value Dth2 referred to in the white line extraction processing is set such that threshold value Dth2 decreases as distance from a target pixel to a reference pixel increases. By use of such a white line whose thickness changes in accordance with a distance from the virtual camera, the converted image gives a view a sense of depth. It also is of note that among white lines edging the outline of object E9, a white line (see two-dot chain line L2) having an object far away from the virtual camera as its backdrop is deeper in color than a white line (see two-dot chain line L3) having an object near the virtual camera as its backdrop. This is because, as a result of the white line extraction processing, a density of white color increases relative to an increase in a difference of depth value between a target pixel and a reference pixel. By use of such a white line whose intensity changes in accordance with a distance from the background, it is possible to avoid sudden disappearance of a white line that surrounds an object having portions different in distance from the background. It also is of note that the converted image is brighter than the pre-conversion image so that visibility of objects E8 and E9 in the converted image is better than that in the pre-conversion image. This is because, in the quaternary processing, the threshold values are calculated based on an average brightness, a maximum brightness, and a minimum brightness of a pre-conversion image. As a result of the quaternary processing, a dark pre-conversion image is converted into a brighter converted image.

2. Modifications

The above embodiment may be modified as described below. Two or more of the following modifications may be combined with each other.

2-1. Modification 1

In the above embodiment, where all pixels of a pre-conversion image are subjected to a cartoon filter processing, only some of the pixels may be subjected to a cartoon filter processing. For example, only pixels of characters or only pixels of objects specified by a player may be subjected to a cartoon filter processing.

2-2. Modification 2

In the above quaternary processing, where pixels are classified into four levels of white, gray, tone, and black based on a brightness of pixel, the pixels may be classified based on a balance of RGB values, instead of a brightness of pixel. A combination of colors for the four levels is not limited to the combination of white, gray, tone, and black, and may be another combination of colors such as a combination of white, low-density tone, high-density tone, and black. Pixels may be classified into three or less levels or five or more levels, instead of four levels. In a case where pixels are classified into three levels, they may be classified into three levels of white, gray, and black.

2-3. Modification 3

In the above black line extraction processing, the shape and size of the predetermined area in which reference pixels are selected is not limited to the examples shown in FIGS. 7 and 8, and may be set freely. Reference pixels do not necessarily need to be adjacent to a target pixel. Also, in the above black line extraction processing, where when a difference in pixel value (an RGB value) between a target pixel and a reference pixel is larger than a threshold value, a pixel corresponding to the target pixel is expressed in black, when differences in a predetermined number of RGB values between the two pixels are larger than the threshold value, the corresponding pixel may be expressed in black. Alternatively, when a difference in average of a predetermined number of RGB values between the two pixels is larger than the threshold value, the corresponding pixel may be expressed in black. Also, in the above black line extraction processing, where when a target pixel satisfies condition A, B, or C relative to one of reference pixels, a pixel corresponding to the target pixel is expressed in black, when the target pixel satisfies condition A, B, or C relative to a predetermined number of reference pixels, the corresponding pixel may be expressed in black. Alternatively, when the target pixel satisfies condition A, B, or C relative to an average of a predetermined number of reference pixels, the corresponding pixel may be expressed in black. The color in which pixels are expressed in the black line extraction processing may be a color different from black.

2-4. Modification 4

In the above white line extraction processing, the shape and size of the predetermined area in which reference pixels are selected is not limited to the example shown in FIG. 9, and may be set freely. Reference pixels do not necessarily need to be adjacent to a target pixel. Also, in the above white line extraction processing, where when a target pixel satisfies conditions D and E based on an average of depth values of a reference pixel group, a pixel corresponding to the target pixel is expressed in white, when the target pixel satisfies conditions D and E relative to a predetermined number of reference pixels, the corresponding pixel may be expressed in white. Also, in the above white line extraction processing, where threshold value Dth2 is changed in accordance with a distance between a target pixel and a reference pixel so that thickness of a white line changes relative to distance from the virtual camera, a size of a predetermined area in which reference pixels are selected may be changed in accordance with a depth value of the target pixel. More specifically, the size of the predetermined area may be made smaller relative to increase in the depth value of the target pixel. This modification makes it possible to change thickness of a white line in accordance with a distance from the virtual camera. The color in which pixels are expressed in the white line extraction processing may be a color other than white, that can be distinguished from the color used by black line extraction unit 552 to express pixels.

2-5. Modification 5

In the above cartoon filter processing, where the black line extraction processing is followed by the white line extraction processing, the white line extraction processing may be followed by the black line extraction processing.

2-6. Modification 6

In the above black line extraction processing, where a determination is made for each of conditions A, B, and C, a determination for one or more of the conditions may be omitted. For example, a determination for conditions A and B may be omitted. In that case, first color buffer 51 is not used in the black line extraction processing and the white line extraction processing, so that in the cartoon filter processing, a converted image may be written over a pre-conversion image in first color buffer 51.

2-7. Modification 7

Game system 1 is an example of an image-processing system capable of performing the cartoon filter processing. The cartoon filter processing may be performed in an image-processing device such as a smartphone or a tablet device, or may be performed in an image-processing system including networked information-processing devices.

What is claimed is:

1. A non-transitory storage medium storing an image-processing program that comprises instructions that cause a computer to:
   render an image of a three-dimensional (3D) virtual space by use of a depth buffer to generate a pre-conversion image;
   perform an image conversion processing on the pre-conversion image to generate a converted image;
   as part of the image conversion processing;
      perform a first rendering of identifying a first pixel of the pre-conversion image that is smaller in depth than another pixel positioned in a first area around the first pixel, and differs in depth from the another pixel positioned in the first area by more than a first reference value, and of expressing a pixel of the converted image corresponding to the first pixel in a first color, and
      perform a second rendering of identifying a second pixel of the pre-conversion image that is larger in depth than another pixel positioned in a second area around the second pixel, and differs in depth from the another pixel positioned in the second area by more than a second reference value, and of expressing a pixel of the converted image corresponding to the second pixel in a second color.

2. The non-transitory storage medium according to claim 1, wherein the image-processing program comprises further instructions that cause the computer to, as part of the image conversion processing and, prior to the first rendering and the second rendering:
   perform a gradation processing of classifying each pixel of the pre-conversion image as a type based on a predetermined condition, and
   express, as part of the performed gradation processing, at least one pixel of the converted image, in a color that corresponds to the type as which a corresponding pixel of the pre-conversion image was classified.

3. The non-transitory storage medium according to claim 2, wherein the type of each pixel is classified based on a brightness of each pixel.

4. The non-transitory storage medium according to claim 1, wherein identification of the first pixel is further based on a normal direction of the first pixel differing in normal direction from another pixel positioned in a third area around the first pixel by more than a third reference value.

5. The non-transitory storage medium according to claim 1, wherein identification of the first pixel is further based on a pixel value of the first pixel differing from a pixel value of another pixel positioned in a fourth area around the first pixel by more than a fourth reference value.

6. The non-transitory storage medium according to claim 1, wherein the converted image is colored in gray from the pre-conversion image, wherein the second color is brighter than the first color.

7. The non-transitory storage medium according to claim 1, wherein identification of the second pixel is further based on being smaller in depth than a fifth reference value.

8. The non-transitory storage medium according to claim 7, wherein the image-processing program comprises further instructions that cause the computer to;
   increase the fifth reference value based on determination that the second pixel is near the another pixel positioned in the second area,
   decrease the fifth reference value based on determination that the second pixel is far away from the another pixel positioned in the second area.

9. An image-processing system comprising:
   memory; and
   at least one processor configured to:
   render an image of a three-dimensional (3D) virtual space by use of a depth buffer to generate a pre-conversion image;
   generate a converted image based on the pre-conversion image;
   identify a first pixel of the pre-conversion image that is smaller in depth than another pixel positioned in a first area around the first pixel, and differs in depth from the another pixel that is positioned in the first area by more than a first reference value;
   based on identification of the first pixel, setting a corresponding pixel, which corresponds to the first pixel, in the converted image to a first color;
   identify a second pixel of the pre-conversion image that is larger in depth than another pixel positioned in a second area around the second pixel, and differs in depth from the another pixel that is positioned in the second area by more than a second reference value; and
   based on identification of the second pixel, setting a corresponding pixel, which corresponds to the second pixel, in the converted image to a second color.

10. The image-processing system according to claim 9, wherein the at least one processor is further configured to:
    perform gradation processing to classify each pixel of the pre-conversion image as a type based on a predetermined condition; and
    set, as part of the gradation processing, at least one pixel of the converted image to a color that corresponds to the type of a corresponding pixel from the pre-conversion image.

11. The image-processing system according to claim 10, wherein the type of each pixel is classified based on a brightness of each corresponding pixel.

12. The image-processing system according to claim 9, wherein identification of the first pixel is further based on a normal direction that is associated with the first pixel differing from a normal direction from another pixel positioned in a third area around the first pixel by more than a third reference value.

13. The image-processing system according to claim 9, wherein identification of the first pixel is further based on a pixel value of the first pixel differing from a pixel value of another pixel positioned in a fourth area around the first pixel by more than a fourth reference value.

14. The image-processing system according to claim 9, wherein
    the converted image is colored in gray; and
    the second color is brighter than the first color.

15. The image-processing system according to claim 9, wherein identification of the second pixel is further based on being smaller in depth than a fifth reference value.

16. The image-processing system according to claim 15, the at least on processor configured to:
  increase the fifth reference value based on determination that the second pixel is near the another pixel positioned in the second area, and
  decrease the fifth reference value based on determination that the second pixel is far away from the another pixel positioned in the second area.

17. The image-processing system according to claim 9, wherein the at least one processor is further configured to:
  control a position or an attitude of a virtual camera disposed within the 3D virtual space based on received user input operations; and
  render an image of the 3D virtual space based on the controlled position or attitude of the virtual camera.

18. An image-processing device comprising:
  memory; and
  at least one processor configured to:
  render an image of a three-dimensional (3D) virtual space by use of a depth buffer to generate a pre-conversion image; and
  generate a converted image by using the pre-conversion image and image processing that includes at least:
  identification of a first pixel of the pre-conversion image that is smaller in depth than another pixel positioned in a first area around the first pixel, and differs in depth from the another pixel that is positioned in the first area by more than a first reference value,
  express a first corresponding pixel in the converted image in a first color, wherein the first corresponding pixel corresponds to the identified first pixel,
  identification of a second pixel of the pre-conversion image that is larger in depth than another pixel positioned in a second area around the second pixel, and differs in depth from the another pixel that is positioned in the second area by more than a second reference value, and
  express a second corresponding pixel in the converted image in a second color, wherein the second corresponding pixel corresponds to the identified second pixel.

19. An image-processing method comprising:
  rendering an image of a three dimensional (3D) virtual space by use of a depth buffer to generate a pre-conversion image; and
  generating a converted image by performing image conversion processing on the pre-conversion image, wherein the image conversion processing comprises:
    performing a first rendering of identifying a first pixel of the pre-conversion image that is smaller in depth than another pixel positioned in a first area around the first pixel, and differs in depth from the another pixel position in the first area by more than a first reference value, and of expressing a pixel of the converted image corresponding to the identified first pixel in a first color; and
    performing a second rendering of identifying a second pixel of the pre-conversion image that is larger in depth than another pixel positioned in a second area the second pixel, and differs in depth from the another pixel position in the second area by more than a second reference value, and of expressing a pixel of the converted image corresponding to the identified second pixel in a second color.

* * * * *